United States Patent
Wilson et al.

(10) Patent No.: US 9,988,921 B2
(45) Date of Patent: Jun. 5, 2018

(54) CIRCUMFERENTIAL SEAL WITH SEAL DAMPENING ELEMENTS

(71) Applicant: United Technologies Corporation, Farmington, CT (US)

(72) Inventors: Ross Wilson, South Glastonbury, CT (US); Michael G. McCaffrey, Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days. days.

(21) Appl. No.: 14/882,672

(22) Filed: Oct. 14, 2015

(65) Prior Publication Data

US 2016/0108750 A1 Apr. 21, 2016

Related U.S. Application Data

(60) Provisional application No. 62/065,484, filed on Oct. 17, 2014.

(51) Int. Cl.
| | | |
|---|---|---|
| *F01D 11/02* | (2006.01) | |
| *F01D 11/00* | (2006.01) | |
| *F01D 25/04* | (2006.01) | |
| *F16J 15/16* | (2006.01) | |
| *F16J 15/44* | (2006.01) | |

(52) U.S. Cl.
CPC ............ *F01D 11/025* (2013.01); *F01D 11/00* (2013.01); *F01D 11/001* (2013.01); *F01D 11/003* (2013.01); *F01D 11/02* (2013.01); *F01D 25/04* (2013.01); *F16J 15/16* (2013.01); *F16J 15/445* (2013.01); *F05D 2220/32* (2013.01); *F05D 2240/55* (2013.01)

(58) Field of Classification Search
CPC ...... F01D 11/025; F01D 11/00; F01D 11/001; F01D 11/003; F01D 11/02; F01D 25/04; F05D 2220/32; F05D 2240/55; F16J 15/16; F16J 15/44
USPC ......................................................... 277/411
See application file for complete search history.

(56) References Cited

U.S. PATENT DOCUMENTS

| | | | | |
|---|---|---|---|---|
| 1,925,072 A | * | 8/1933 | Griswold ............ | F16F 15/1442 74/574.2 |
| 2008/0100000 A1 | * | 5/2008 | Justak .................... | F16J 15/442 277/355 |

(Continued)

FOREIGN PATENT DOCUMENTS

| | | |
|---|---|---|
| EP | 2495398 A2 | 9/2012 |
| GB | 2450213 A | 12/2008 |
| WO | 2014143284 A1 | 9/2014 |

OTHER PUBLICATIONS

European Search Report for Application No. 15192466.1-1610; dated Mar. 15, 2016; 7 pgs.

*Primary Examiner* — Nathan Cumar
(74) *Attorney, Agent, or Firm* — Cantor Colburn LLP

(57) ABSTRACT

The present disclosure relates to sealing systems for gas turbine engines. In one embodiment, a circumferential seal for a gas turbine engine includes a first beam, a second beam, a seal shoe and at least one feature between the first beam and second beam configured to retain a beam spacer, wherein the at least one feature is configured to dampen at least one of beam and shoe vibration of the circumferential seal. Another embodiment is directed to a circumferential seal including a beam spacer.

16 Claims, 3 Drawing Sheets

(56) References Cited

U.S. PATENT DOCUMENTS

| | | | |
|---|---|---|---|
| 2008/0197575 A1* | 8/2008 | El-Aini | F01D 11/02 277/303 |
| 2008/0246223 A1* | 10/2008 | Justak | F01D 11/02 277/411 |
| 2011/0121519 A1* | 5/2011 | Justak | F01D 11/025 277/412 |
| 2014/0119912 A1 | 5/2014 | Bidkar et al. | |

* cited by examiner

CIRCUMFERENTIAL SEAL WITH SEAL DAMPENING ELEMENTS

CROSS REFERENCE TO RELATED APPLICATIONS

This application claims the benefit of U.S. Provisional Patent Application Ser. No. 62/065,484 filed Oct. 17, 2014, the entire contents of which are incorporated herein by reference thereto.

BACKGROUND

The present disclosure relates to gas turbine engine sealing systems and, more particularly, to a circumferential seals.

Gas turbine engine components are required to operate efficiently during engine operation and flight. Components within the gas turbine engine aid in protecting operation and allow for operation at a high speed. Engine components rotating at high speeds require even sealing in order to operate efficiently and also to reduce damage to the engine. However, rotation of engine components can create vibrations which may reduce the efficiency and cause component and/or engine wear. Accordingly, there is a need to provide components which minimize and/or limit vibration for a gas turbine engine.

BRIEF SUMMARY OF THE DISCLOSURE

Disclosed and claimed herein are sealing systems and circumferential seals for gas turbine engines. One embodiment is directed to a circumferential seal for a gas turbine engine, the circumferential seal including a first beam, a second beam, a seal shoe, and at least one feature between the first beam and second beam configured to retain a beam spacer, wherein the at least one feature is configured to dampen at least one of beam and shoe vibration of the circumferential seal.

In one embodiment, the first beam is an outer beam of the circumferential seal.

In one embodiment, the second beam is an inner beam of the circumferential seal.

In one embodiment, the at least one feature is a cradle feature including a channel configured to receive a beam spacer along the axial depth of the circumferential seal.

In one embodiment, the at least one feature includes raised portions of the first beam and raised portions of the second beam, wherein the raised portions of the inner and outer beam form a channel between the first and second beam to secure a beam spacer.

In one embodiment, the at least one feature is configured to retain a beam spacer configured to dampen vibratory responses of the circumferential seal between the first and second beams.

In one embodiment, the circumferential seal is a non-contact seal for a bearing compartment of the gas turbine engine.

In one embodiment, the circumferential seal is at least one of a full ring and segmented seal.

In one embodiment, the beam spacer is an elongated element having at least one of a pin, rod, cylindrical, round, square, rectangular, round, and oval shape, and the beam spacer is configured to dampen beam and shoe response of the circumferential seal.

In one embodiment, the circumferential seal further includes a plurality of beam spacers and features to retain the beam spacer.

Another embodiment is directed to a circumferential seal for a gas turbine engine, the circumferential seal including a first beam, a second beam, a seal shoe, a beam spacer between the first beam and second beam, and at least one feature between the first beam and second beam configured to retain the beam spacer, wherein the at least one feature is configured to dampen at least one of beam and shoe vibration of the circumferential seal In one embodiment, the first beam is an outer beam of the circumferential seal.

In one embodiment, the second beam is an inner beam of the circumferential seal.

In one embodiment, the at least one feature is a cradle feature including a channel configured to receive a beam spacer along the axial depth of the circumferential seal.

In one embodiment, the at least one feature includes raised portions of the first beam and raised portions of the second beam, wherein the raised portions of the inner and outer beam form a channel between the first and second beam to secure a beam spacer.

In one embodiment, the at least one feature is configured to retain a beam spacer configured to dampen vibratory responses of the circumferential seal between the first and second beams.

In one embodiment, the circumferential seal is a non-contact seal for a bearing compartment of the gas turbine engine.

In one embodiment, the circumferential seal is at least one of a full ring and segmented seal.

In one embodiment, the beam spacer is an elongated element having at least one of a pin, rod, cylindrical, round, square, rectangular, round, and oval shape, and the beam spacer is configured to dampen beam and shoe response of the circumferential seal.

In one embodiment, the circumferential seal for a gas turbine engine further includes a plurality of beam spacers and features to retain the beam spacer.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE DISCLOSURE

Overview and Terminology

One aspect of the disclosure relates to circumferential seals for a gas turbine engine, and in particular, to dampening at least one of beam and shoe response of a circumferential seal. One embodiment is directed to features of the circumferential seal providing sealing and dampening to allow for a wider range of operation for the circumferential seal. Circumferential seals as discussed herein may relate to seals for bearing compartments of gas turbine engine, and/or seals associated with rotating components of a gas turbine engine. The circumferential seal may be used in one or more compartments or systems of a gas turbine engine, such as bearing compartments, gear systems, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
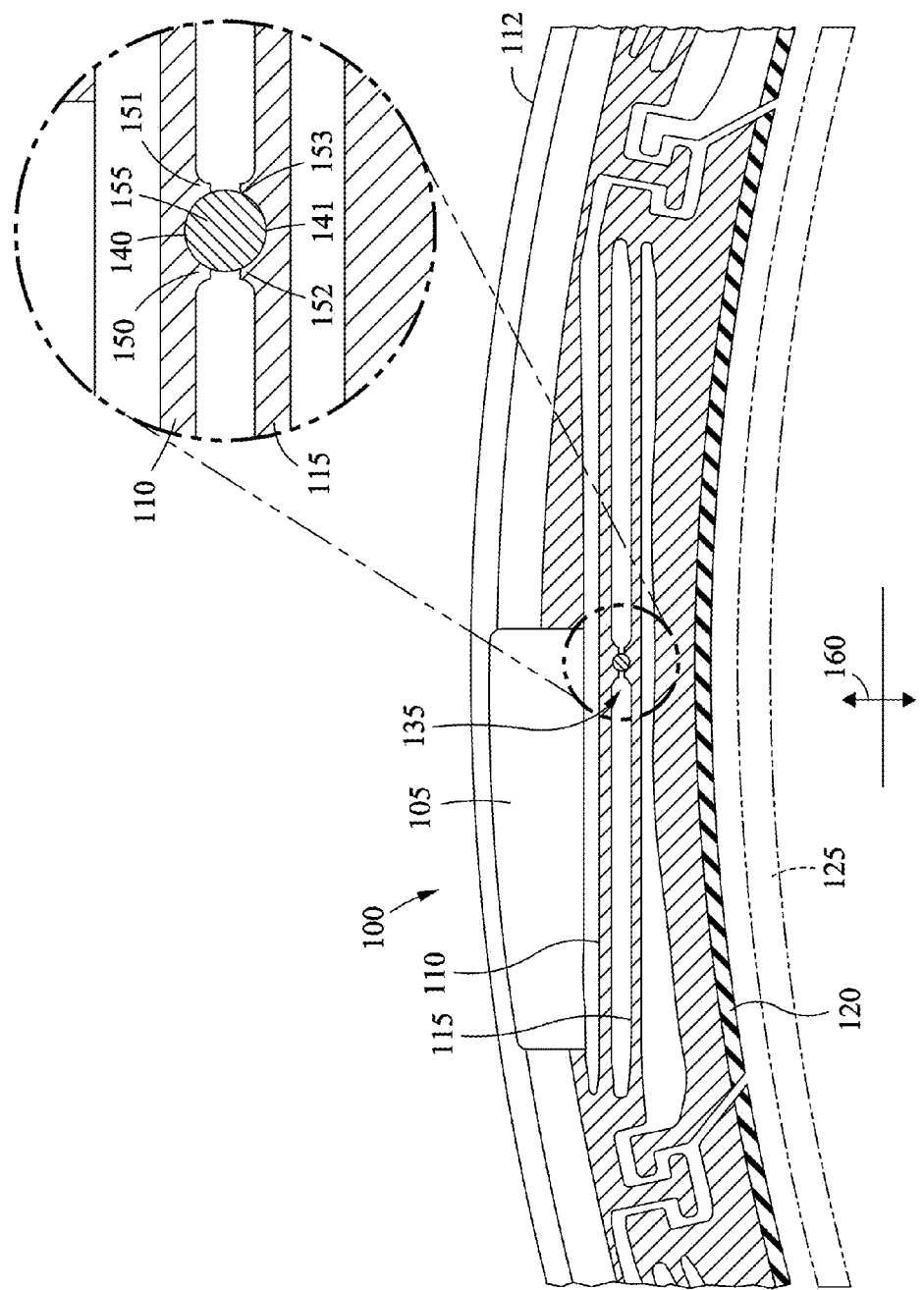
FIG. 1 depicts a circumferential seal for a gas turbine engine according to one or more embodiments.

Referring now to the figures, FIG. 1 depicts a circumferential seal for a gas turbine engine according to one or more embodiments. According to one embodiment, circumferential seal 100 includes outer seal body 105, outer beam 110, outer seal surface 112, inner beam 115, and seal shoe 120. FIG. 1 is a representation of a circumferential seal 100 viewing the seal along its front face including an enlarged representation of a portion of the seal.

Circumferential seal 100 may be configured as a seal for rotating component 125 wherein one or more of outer beam 110, inner beam 115, and seal shoe 120 may interoperate as a non-contacting seal. In an exemplary embodiment, circumferential seal 100 may be a non-contacting aerodynamic film-riding seal. According to one embodiment, circumferential seal 100 may be provided with a wider range of operation by including one or more features to allow for the seal to retain a beam dampening element 155. As will be discussed below, one of more features of circumferential seal 100 dampen vibration associated with beam and shoe response.

Circumferential seal 100 may include at least one feature between a first beam and second beam configured to retain a beam spacer. By way of example, the first beam may be outer beam 110 and the second beam may be inner beam 115. The at least one feature may be configured to dampen at least one of beam and shoe vibration of the circumferential seal 100.

According to one embodiment, cradle features 135 may be provided to retain a dampening element for circumferential seal 100. Cradle features 135 may include curved recesses 140 and 141, and raised portions 150, 151, 152 and 153. Curved recesses 140 and 141 of cradle features 135 form a channel within raised portions 150, 151, 152 and 153, the channel configured to receive a beam spacer, such as beam spacer 155, along the axial depth of the circumferential seal 100. Raised portions 150, 151, 152 and 153 of beams 110 and 115 may also form a channel to secure a beam spacer, such as beam spacer 155. In certain embodiments, cradle features 135 are configured to retain beam spacer 155 to dampen vibratory responses of the circumferential seal 100 between outer beam 110 and inner beam 115, such as beam and shoe response of the circumferential seal. Beam spacer 155 may relate to an elongated element having at least one of a pin, rod, cylindrical, round, square, rectangular, round, and oval shape, wherein the beam spacer is configured to dampen beam and shoe response of the circumferential seal 100. Beam spacer 155 may have a non-uniform or uniform cross-section to allow for particular configurations including raised elements from the beam spacer 155. According to one more embodiments, beam spacer 155 and cradle features 135 may have corresponding surfaces configured to engage with each other.

Cradle features 135 may be configured to retain a beam spacer 155. According to another embodiment, cradle features 135 and beam spacer 155 may be configured to dampen radial movement (e.g., movement in and out, to and from the engine centerline), shown as 160, of circumferential seal 100. Similarly, cradle features 135 and beam spacer 155 may be configured to dampen beam and shoe response of circumferential seal 100. According to certain embodiments, dampening of the radial movement as described herein allows for movement in the radial direction of circumferential seal 100 to reduce the vibratory response of shoes and/or beams without limiting the radial movement of seals/shoes in order to still provide an adaptive and compliant seal.

In certain embodiments, circumferential seal 100 may include a plurality of beam spacers. Accordingly, circumferential seal 100 may include cradle features 135 in a plurality of positions of the seal, as will be described in more detail below with respect to FIG. 3.

Circumferential seal 100 may be a full ring seal. In other embodiments, circumferential seal 100 relates to a segmented seal. Circumferential seal 100 may be a non-contact seal for a bearing compartment of the gas turbine engine Circumferential seal 100 is shown in FIG. 2 according to one or more embodiments.

Figure 2:
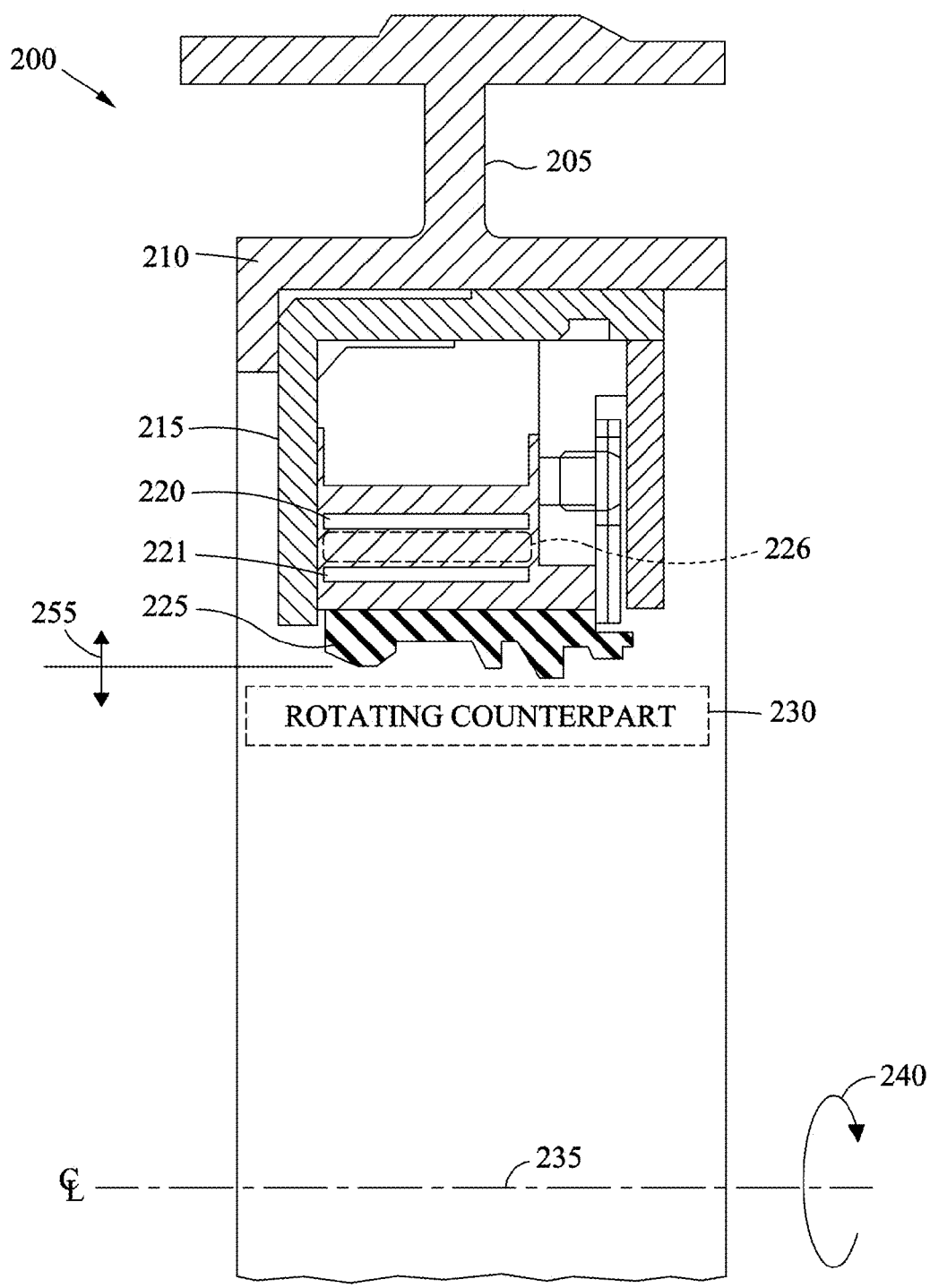
FIG. 2 depicts a cross-sectional representation of a circumferential seal system according to one or more embodiments.

FIG. 2 depicts a cross-sectional representation of a circumferential seal system according to one or more embodiments. According to one embodiment, seal system 200 includes a static engine mount 205 coupled to a seal support structure 210. Engine mount 205 is configured for mounting the seal support structure 210 to a gas turbine engine mount. Engine support 205 may be a flange portion of seal support structure 210.

Seal support structure 210 is configured to retain circumferential seal 215. Seal support 210 can include a shoulder and runner configured to retain circumferential seal 215. For example, a runner may be a lip in parallel or substantially parallel to engine support 205 and extending over a face of circumferential seal 215. The runner can extend along the outer diameter of circumferential seal 215.

According to one embodiment, circumferential seal 215 includes at least one outer beam 220 and at least one inner beam 221. Circumferential seal 215 includes at least one seal shoe 225. Circumferential seal 215 may be configured to provide a seal for a rotating component 230. According to one embodiment, circumferential seal 215 is configured relative to axis 235 and is configured as a static (i.e., with regards to rotation) relative to rotation components rotation shown as 240.

Outer beam 220 and inner beam 221 may include one or more features to retain a beam spacer, shown as 226, in FIG. 2. Beam spacer 226 may run the entire axial length of outer beam 220 and inner beam 221. In certain embodiments, beam spacer 226 may run a portion of the axial length of outer beam 220 and inner beam 221.

Radial movement, shown as 255, of circumferential seal 215 can be caused by beam (e.g., outer beam 220, inner beam 221) and shoe (e.g., shoe 225) response to rotation 240 and/or vibration of a gas turbine engine relative to a static mount 210.

Figure 3:
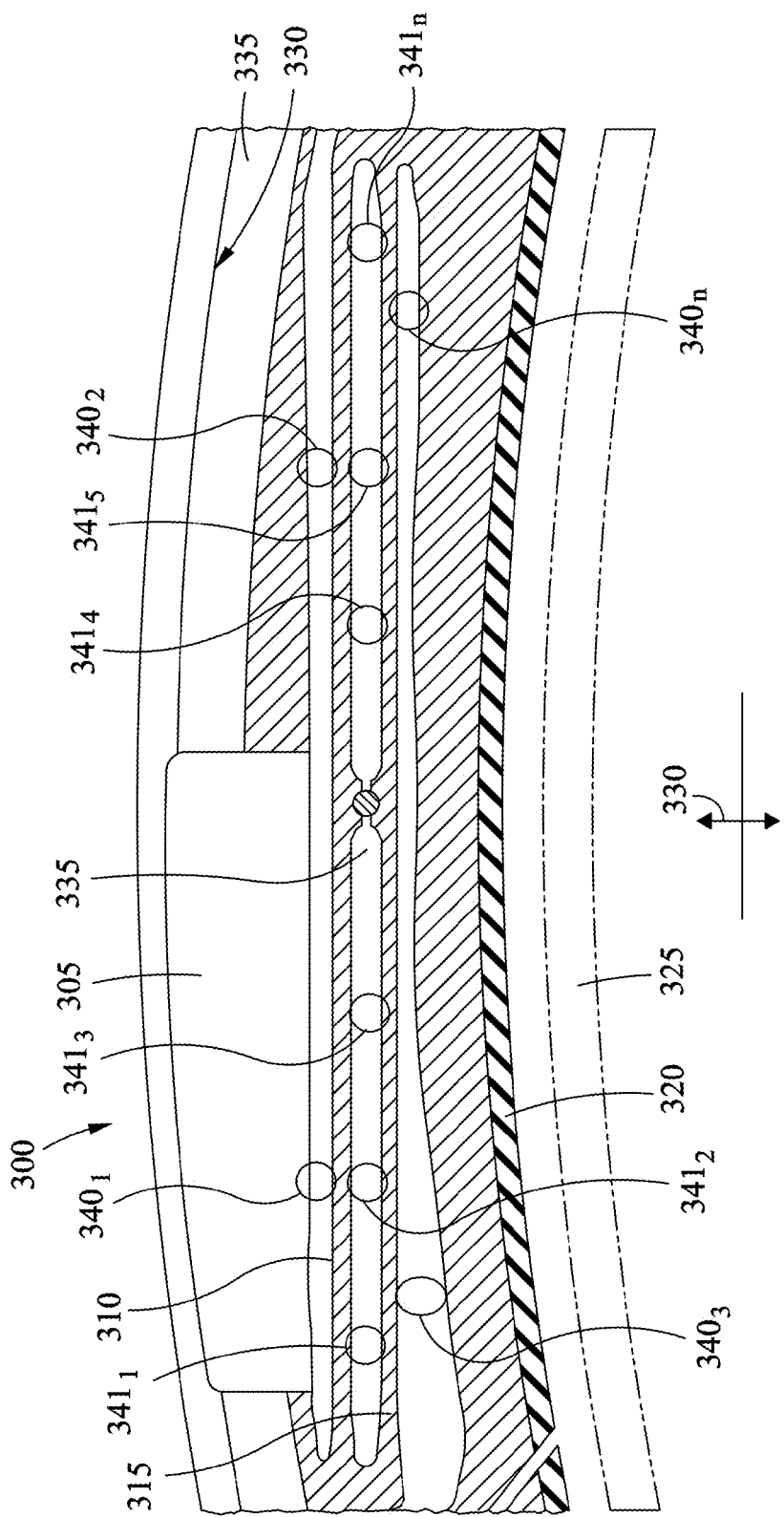
FIG. 3 depicts a graphical representation of circumferential seal and dampening locations according to one or more embodiments.

FIG. 3 depicts a graphical representation of circumferential seal and dampening locations according to one or more embodiments. As discussed above, a circumferential seal (e.g., circumferential seal 100, circumferential seal 215) is provided which can include one or more cradle features and dampening elements between a first and second beam of a circumferential seal, such as the outer and inner beams of circumferential seal 100 of FIG. 1. According to another embodiment, a circumferential seal may include one or more dampening elements and features between other channels of the circumferential seal.

FIG. 3 depicts a circumferential seal 300 according to another embodiment, indicating one or more additional or different position's and areas for beam dampening elements and features for retaining beam dampening elements (e.g., cradles features 135).

According to one embodiment, circumferential seal 300 includes outer seal body 305, outer beam 310, inner beam 315, and seal shoe 320. FIG. 3 is a representation of a circumferential seal 300 viewing the seal along its front face. Circumferential seal 300 may be configured as a seal for rotating component 325 wherein one or more of outer beam 310, inner beam 315, and seal shoe 320 may interoperate as a non-contacting seal. According to one embodiment, circumferential seal 300 may retain a beam dampening element 335. One or more features of circumferential seal 300 dampen vibration associated with beam and shoe response including radial vibration shown as 330.

Circumferential seal 300 may include at least one feature and/or beam dampening elements between beams other than the inner and outer beam. By way of example, potential locations for cradle features and beam dampening elements are shown in FIG. 3 by 335. Exemplary positions for beam dampening elements are shown as $340_{1-n}$ and $341_{1-n}$.

While this disclosure has been particularly shown and described with references to exemplary embodiments thereof, it will be understood by those skilled in the art that various changes in form and details may be made therein without departing from the scope of the claimed embodiments.

What is claimed is:

1. A circumferential seal for a gas turbine engine, the circumferential seal comprising:
    a first beam;
    a second beam;
    a seal shoe;
    at least one feature defined by a pair of raised portions of the first beam and a pair of raised portions of the second beam, the pair of raised portions of the first beam facing the pair of raised portions of the second beam and the at least one feature defining a channel along an axial depth of the circumferential seal;
    a beam spacer located in the channel and between the first beam and the second beam; and
    wherein the beam spacer dampens vibratory responses of the circumferential seal.

2. The circumferential seal of claim 1, wherein the first beam is an outer beam of the circumferential seal.

3. The circumferential seal of claim 1, wherein the second beam is an inner beam of the circumferential seal.

4. The circumferential seal of claim 1, wherein the beam spacer dampens vibratory responses between the first and second beams of the circumferential seal.

5. The circumferential seal of claim 1, wherein the circumferential seal is a non-contact seal for a bearing compartment of the gas turbine engine.

6. The circumferential seal of claim 1, wherein the circumferential seal is at least one of a full ring and segmented seal.

7. The circumferential seal of claim 1, wherein the beam spacer is an elongated element, pin, rod, having at least one of a cylindrical, round, square, rectangular, round, and oval shape, and wherein the beam spacer dampens vibratory responses of the first beam and/or the second beam and the seal shoe of the circumferential seal.

8. The circumferential seal of claim 1, wherein the at least one feature is a plurality of features each defining a channel along an axial depth of the circumferential seal and a beam spacer is located in each of the channels.

9. A circumferential seal for a gas turbine engine, the circumferential seal comprising:
    a first beam;
    a second beam;
    a seal shoe;
    at least one cradle feature between the first beam and the second beam including a pair of raised portions of the first beam and a pair of raised portions of the second beam, wherein the pair of raised portions of the first beam and the pair of raised portions of the second beam face each other and form a channel between the first beam and the second beam;
    a beam spacer located in the channel, wherein the channel receives and secures the beam spacer along an axial depth of the circumferential seal, and wherein the at least one cradle feature is configured to dampen at least one of beam and shoe vibration of the circumferential seal.

10. The circumferential seal of claim 9, wherein the first beam is an outer beam of the circumferential seal.

11. The circumferential seal of claim 9, wherein the second beam is an inner beam of the circumferential seal.

12. The circumferential seal of claim 9, wherein the beam spacer dampens vibratory responses between the first and second beams of the circumferential seal.

13. The circumferential seal of claim 9, wherein the circumferential seal is a non-contact seal for a bearing compartment of the gas turbine engine.

14. The circumferential seal of claim 9, wherein the circumferential seal is at least one of a full ring and segmented seal.

15. The circumferential seal of claim 9, wherein the beam spacer is an elongated element, pin, rod, having at least one of a cylindrical, round, square, rectangular, round, and oval shape, and wherein the beam spacer dampens vibratory responses of the first beam and/or the second beam and the seal shoe of the circumferential seal.

16. The circumferential seal of claim 9, wherein the at least one cradle feature is a plurality of cradle features each defining a channel along an axial depth of the circumferential seal and a beam spacer is located in each of the channels.

* * * * *